United States Patent [19]

Moya et al.

[11] Patent Number: 5,554,414
[45] Date of Patent: Sep. 10, 1996

[54] PROCESS FOR FORMING MEMBRANE HAVING A HYDROPHOBIC FLUOROPOLYMER SURFACE

[75] Inventors: Wilson Moya, Derry; Philip M. Goddard, New Ipswich, both of N.H.

[73] Assignee: Millipore Investment Holdings Limited, Wilmington, Del.

[21] Appl. No.: 421,126

[22] Filed: Apr. 12, 1995

[51] Int. Cl.$^6$ ........................................ B05D 5/00
[52] U.S. Cl. ................ 427/244; 427/245; 427/393.5; 427/394
[58] Field of Search ............................... 427/244, 245, 427/393.5, 394, 387

[56] References Cited

U.S. PATENT DOCUMENTS

| | | | |
|---|---|---|---|
| 3,253,057 | 5/1966 | Landler et al. . | |
| 4,151,225 | 4/1979 | Büning . | |
| 4,230,463 | 10/1980 | Henis et al. | 427/245 |
| 4,278,777 | 7/1981 | Jakabhazy et al. . | |
| 4,311,573 | 1/1982 | Chin et al. . | |
| 4,377,619 | 3/1983 | Schonhorn et al. | 427/259 |
| 4,506,035 | 3/1985 | Barnett et al. | 521/53 |
| 4,618,533 | 10/1986 | Steuck | 428/315.7 |
| 4,749,414 | 6/1988 | Wu et al. | 106/183 |
| 4,914,171 | 4/1990 | Zweig | 526/246 |
| 4,954,256 | 9/1990 | Degen et al. | 210/490 |
| 5,024,507 | 6/1991 | Minns et al. | 427/163.2 |
| 5,037,457 | 8/1991 | Goldsmith et al. | 55/158 |
| 5,156,780 | 10/1992 | Kenigsberg et al. | 427/513 |
| 5,217,802 | 6/1993 | Scarmoutzos . | |
| 5,268,783 | 12/1993 | Yoshinaga et al. | 359/103 |
| 5,286,382 | 2/1994 | Scarmoutzos et al. | 210/490 |

FOREIGN PATENT DOCUMENTS

| | | |
|---|---|---|
| 0216622 | 9/1986 | European Pat. Off. . |
| WO91/01791 | 2/1991 | WIPO . |

*Primary Examiner*—Diana Dudash
*Attorney, Agent, or Firm*—Andrew T. Karnakis; Paul J. Cook

[57] ABSTRACT

A composite porous article is formed from a porous polymeric substrate having its entire surface modified with a cross-linked polymer which results in a hydrophobic and oleophobic surface. The composite retains substantially all of the other original properties of the substrate. The cross-linked polymer is formed in situ on the polymeric substrate from a reactant system comprising an ethylenically unsaturated monomer having at least one fluoroalkyl group, a cross-linker, and, if needed, a polymerization initiator, dissolved in a polar solvent system. The porous substrate saturated with the reactant system is exposed to a suitable energy source to effect polymerization and cross-linking of the monomer.

23 Claims, No Drawings

PROCESS FOR FORMING MEMBRANE HAVING A HYDROPHOBIC FLUOROPOLYMER SURFACE

BACKGROUND OF THE INVENTION

This invention relates to a composite porous article having both a hydrophobic (water repellent) and oleophobic (oil repellent) surface. More particularly, this invention relates to a composite porous article such as a microporous or ultrafiltration membrane modified to produce a hydrophobic/oleophobic surface including the membrane pore surfaces and to a process for forming such a membrane.

Polytetrafluoroethylene (PTFE) has been the most commonly used material in membranes utilized to vent gases. The chemical and biological inertness, thermal stability, and hydrophobicity inherently associated with PTFE has led to the development of PTFE as the material of choice in industrial gas vent applications. PTFE membranes have also found widespread use in the health and related industries. The necessity of producing aseptic vent membranes for use in medical/biological devices has also naturally led to the selection of PTFE as the choice material in membrane applications. Traditionally, aseptic materials have been generated by chemical sterilization, notably by steam treatment or treatment with ethylene oxide. The compatibility of PTFE with sterilizing chemicals and treatments, especially at elevated temperatures, is a well known material property characteristic of PTFE. A problem sometimes encountered with the use of PTFE as a vent membrane material under steam treatment is pore blockage due to condensation of oil from the machinery used to generate the steam. The resulting loss of air permeability of the clogged membrane effectively reduces the membrane's utility as a gas vent. This condensation problem has led to the search and development of more hydrophobic and oleophobic membrane materials as substitutes for PTFE. A more acute problem concerns the chemical sterilization of membrane materials for use under aseptic conditions. Chemical sterilization, particularly with ethylene oxide, very often generates additional issues such as toxicity and waste disposal that raises serious health, environmental and economic concerns. These concerns have led to the widespread use of ionizing radiation for sterilization of materials used in medical and biological devices. A major disadvantage of PTFE is its inherent instability towards ionizing radiation. Ionizing radiation of PTFE membranes results in the undesirable property of reduced mechanical strength. This loss of mechanical strength places severe restrictions on the use of PTFE membranes under moderate pressures.

Coating of materials allows one to retain the desirable bulk material properties while only altering the surface and interfacial properties of the substrate. Hydrophobic and oleophobic coatings have found popular use in the electronics industry as protective barriers for sensitive electronic components. Although expensive, coating solutions are commercially available. Coatings, however are not permanently anchored to the underlying substrate. Very often the coated materials are susceptible to wear and extraction thereby having a rather limited range of thermal and chemical compatibility.

It also has been proposed to utilize grafting techniques to modify the surface characteristics of a polymer substrate. Typical examples of grafting techniques are shown, for example, in the U.S. Pat. Nos. 3,253,057; 4,151,225; 4,278, 777 and 4,311,573.

It has been proposed in U.S. Pat. No. 4,954,256 to render the surface of a microporous polymeric membrane more hydrophobic by grafting a fluoropolymer to the membrane surface in order to chemically bond the fluoropolymer to the membrane surface. The fluoropolymer is formed from a monomer containing an ethylenically unsaturated group and a fluoroalkyl group. The grafting is effected by exposing the membrane, in a monomeric solution, to ionizing radiation. A typical source of ionizing radiation is a $^{60}Co$ gamma radiation source. The fluoropolymer formed from the fluorine-containing, ethylenically unsaturated monomer is permanently bonded to the microporous membrane substrate.

European patent application 86307259.1 discloses a process for preparing hydrophobic/oleophobic membranes. The process is not a surface modification; it is an in situ process which, by virtue of a phase separation, both the underlying substrate and hydrophobic surface of the membrane are formed simultaneously by a photopolymerization process. The resulting membrane is weak mechanically and needs to be supported/laminated for use as a vent membrane under relatively moderate pressures. In addition, the process gives rise to membranes with a relatively narrow range of properties since the membrane morphology and surface characteristics are formed simultaneously.

Patent application PCT/US90/04058 discloses a process for preparing hydrophobic and oleophobic porous substrates. The process entails impregnating a porous substrate with a solution of a fluorinated monomer in a carrier solvent, removal of the solvent by evaporation, and then polymerization of the remaining monomer. The process is, in essence, a solid-state polymerization reaction.

U.S. Pat. No. 4,618,533 discloses a process for forming a composite membrane from a porous membrane substrate and a cross-linked, polymerizable monomeric composition coated on the substrate. The monomeric composition includes a polymerizable monomer and a cross-linking agent for the monomer. Any conventional energy source for initiating free radical polymerization can be used to form a cross-linked polymeric coating in situ on the porous membrane such as ultraviolet (UV) light or heat. By this process, a membrane having its surface modified by the cross-linked polymer is produced. No mention is made of forming a cross-linked modified surface from an ethylenically unsaturated monomer having a fluroalkyl group.

U.S. Pat. No. 5,037,457 discloses a means for enhancing the mechanical strength of gamma irradiated PTFE membranes by laminating the PTFE membrane to a porous polyester web. This approach resolves the practical issue concerning the mechanical stability of gamma irradiated PTFE. The chemical compatibility of the laminated membrane is now limited by the properties of the porous web support. Furthermore, laminates are prone to delamination, particularly laminates formed by the use of adhesives which often are sensitive to gamma radiation.

U.S. Pat. Nos. 5,217,802 and, 5,286,382 disclose the formation of a composite porous membrane comprising a porous membrane substrate coated with a polymerized and crosslinked polymerizable, fluorine containing monomer such as a polyfluoro substituted alkyl acrylate. The surface is not wet with solvents having a surface tension greater than about 21 mN/m. The crosslinked polymer is formed from a solution containing the fluoro-substituted monomer and a cross-linking agent for the monomer and, optionally a polymerization initiator. These patents disclose that it is necessary to utilize a non-polar or weakly polar solvent in order to obtain the requisite degree of membrane surface modification with the crosslinked polymer utilized for the surface modification without plugging the membrane substrate pores. Generally these solvents, such as siloxanes or silicones have a dielectric constant of about 20 or less. These solvents are undesirable since they are flammable, present an environmental hazard due to their high vapor pressure and are expensive. In addition, since these solvents are not water soluble, their removal from the membrane by washing requires the use of flammable solvents.

Accordingly, it would be desirable to provide a process for producing membranes having an oleophobic and hydrophobic surface which avoids the use of flammable solvents. In addition, it would be desirable to provide such a process which utilizes water soluble solvents which permits the use of water to effect solvent removal from the membrane product. Furthermore, it would be desirable to provide such membranes which are not degraded by ionizing radiation.

SUMMARY OF THE INVENTION

The present invention provides a process for producing a composite porous article having a porous polymeric substrate and a hydrophobic/oleophobic polymeric surface formed from a cross-linked ethylenically unsaturated monomer containing a fluoroalkyl group. Suitable porous polymeric substrates include microporous or ultrafiltration membranes, screens, non woven or woven fabrics, hollow fibers or the like. For convenience, this invention will be specifically described with reference to a membrane substrate. The polymeric surface is formed by coating a porous membrane substrate with a solution of the monomer, a cross linking agent for the monomer, a polymerization initiator, if required and a polar solvent, which can be water soluble. The composite membranes produced by the process of this invention have substantially all of the original properties of the membrane substrate. By the phrase, "substantially all of the original properties of the membrane substrate" is meant the characteristics of the unmodified membrane, that is mechanical and membrane properties such as porosity and permeability. The composite membranes produced by the process of this invention have a hydrophobic/oleophobic surface such that they do not wet with solvents having a surface tension greater than about 21 mN/m. In addition, the composite membranes produced by the process of this invention retain mechanical strength after being exposed to sterilizing ionizing radiation.

DESCRIPTION OF SPECIFIC EMBODIMENTS

In accordance with this invention there is provided a polymeric porous substrate, e.g. a porous membrane substrate having directly deposited throughout its entire surface a polymerized cross-linked polymer formed in situ from an ethylenically unsaturated monomer having at least one fluoroalkyl group. The desired deposition of the cross-linked, polymerized monomer onto the porous membrane substrate is effected as a direct coating and does not require or utilize an intermediate binding chemical moiety. The term "polymer" as used herein is meant to include polymeric compositions formed from one or more monomers. Representative suitable polymers forming the porous membrane substrate include polyolefins such as polyethylene, polypropylene, polymethylpentene or the like; polyamides; polystyrene or substituted polystyrene; fluorinated polymers including poly(tetrafluoroethylene), polyvinylindene fluoride (PVDF) or the like; polysulfones such as polysulfone, polyethersulfone or the like; polyesters including polyethylene terephthalate, polybutylene terephthalate or the like; polyacrylates and polycarbonates; cellulosics; and vinyl polymers such as poly vinyl chloride and polyacrylonitriles. Copolymers also can be employed such as copolymers of butadiene and styrene, fluorinated ethylene-propylene copolymer, ethylene-chlorotrifluoroethylene copolymer or the like. Generally, the porous membrane substrate has an average pore size between about 0.001 and 10 microns, more usually between about 0.01 and 5.0 microns and preferably between 0.1 and 0.5 microns. The pore size of fabric or screen substrates is larger than that of membrane substrates.

The polymerization and cross-linking of the polymerizable monomer onto the porous membrane substrate is effected so that the entire surface of the porous membrane, including the inner surfaces of the porous membrane, is modified with a cross-linked polymer.

A reagent bath comprised of: (1) at least one polymerizable monomer which is ethylenically unsaturated and has at least one fluoroalkyl group, (2) a polymerization initiator, if needed, and (3) a cross-linking agent in a polar solvent such as a water soluble solvent for these three constituents, is contacted with the porous membrane substrate under conditions to effect polymerization and crosslinking of the monomer and deposition of the resulting cross-linked polymer onto the porous membrane substrate. It has been found that even though the solvent is a polar solvent, the requisite degree of membrane surface modification is obtained. When the monomer is difunctional or has higher functionality, an additional cross-linking agent need not be utilized. The hydrophobicity and oleophobicity of the modified surface can be controlled such that the modified membrane does not wet with solvents whose surface tension is greater than about 21 mN/m. Representative suitable polar solvents include solvents having a dielectric constant above 25 at room temperature such as polyols including 2-methyl-2,4-pentanediol, 2,4 pentanedione, glycerine or 2,2'-thiodiethanol; amides such as formamide, dimethyl formamide, dimethyl acetamide; alcohols such as methanol, or the like; and nitro substituted aromatic compounds including nitrobenzene, 2- furaldehyde, acetonitrile, 1-methyl pyrrolidone or the like. The particular solvent is chosen to solublize the cross-linking agent, the monomer and the initiator, if present.

Representative suitable polymerizable and cross-linkable monomers include fluoroacrylates such as 2-(N-ethylperfluorooctanesulfonamido) ethyl acrylate, 2-(N-ethylperfluorooctanesulfonamido) ethyl methacrylate, 1H, 1H-pentadecafluoro octylacrylate, 3,3,4,4,5,5,6,6,7,7,8,8,9,9,10,10,10-heptadecafluorodecyl acrylate, 3,3,4,4,5,5,6,6,7,7,8,8,9,9,10,10,10-heptadecafluorodecyl methacrylate; 1H, 1H-pentadecafluorooctyl methacrylate, 1H, 1H-heptafluorobutyl methacrylate, 1H, 1H, 4H-hexafluoro butyl methacrylate, 1H, 1H, 5H-octafluoropentyl methacrylate, 2, 2, 3,3,3-pentafluoropropyl methacrylate or homologs thereof or mixtures thereof.

Suitable initiators and cross-linking agents for the monomers set forth above are well known in the art. For example, when utilizing fluoroacrylates as the polymerizable monomer, suitable photopolymerization initiators include benzophenone, 4-(2-hyroxyethoxy)phenyl-(2-hydroxy-2-propyl) ketone, azoisopropane or 2,2-dimethoxy-2-phenylacetophenone or the like. Suitable thermal initiators include organic peroxides such as dibenzoyl peroxide, t-butylhydroperoxide, cumylperoxide or t-butyl perbenzoate or the like and azo compounds such as azobisisobutyronitrile (AIBN) or 4,4,'-azobis(4-cyanovaleric acid) or the like. Representative suitable cross-linking agents include 1,6- hexanediol diacrylate, tetraethylene glycol diacrylate, 2,2,3,3,4,4,5,5-octafluorohexanediol-1,6-diacrylate homologs and the like; 1,1,1-trimethylolpropane triacrylate or the like; N,N'-methylene bisacrylamide or the like. When utilizing fluorine containing polymerizable monomers having more than one degree of unsaturation, an additional monomer in the coating of this invention need not be added. The monomer, polymerization initiator and cross-linking agents are contacted with the porous membrane as a mixture in a polar solvent which may be a water soluble solvent which is compatible with the three reactants and the porous membrane so that the desired free radical polymerization and cross-linking is achieved without the formation of a significant amount of slowly extractable by-products. Readily extractable by-products which are formed can be removed by conducting a washing step with a solvent such as water subsequent to the coating step.

Generally, the polymerizable monomer is present in the reactant solution at a concentration between about 2% and about 20%, preferably between about 5% and about 10% based upon the weight of the total solution. The cross-linking agent is present in an amount of between about 2% and about 10% by weight, based upon the weight of the polymerizable monomer. Greater amounts of cross-linking agents can be used but no significant advantage is gained thereby. The polymerization initiator is present in an amount of between about 1% and about 10% by weight, based upon the weight of the polymerizable monomer. As noted above, the cross-linking agent can be utilized without the monomer and thereby functions as the polymerizable monomer.

Polymerization and cross-linking is effected by exposing the monomer reaction system to ultraviolet (UV) light, thermal sources or ionizing radiation. It is preferred to utilize UV light since processing is more convenient. The polymerization and crosslinking is effected in an environment where oxygen does not inhibit polymerization or crosslinking. The process is conveniently effected by dipping the membrane substrate in the solution containing the monomer, crosslinking agent, and the initiator, sandwiching the membrane between two ultraviolet light transparent sheets, such as polyethylene, or in a blanket of an inert gas such as nitrogen and exposing to UV light. The process can be effected continuously and the desired cross-linked coating is formed after UV exposure is initiated. By controlling the reactant concentrations and UV exposure, as set forth above, a composite membrane is produced which is nonplugged and has essentially the same porous configuration as the membrane substrate. The membrane composites of this invention have a highly hydrophobic and oleophobic surface. Furthermore, membrane composites of this invention retain their mechanical strength even after being exposed to sterilizing ionizing radiation.

The membrane composites of this invention, after being sterilized by exposure to gamma radiation, usually between about 2 and 5 Megarads, are capable of withstanding a pressure of at least 10 psi against either surface of the composite membrane. In addition, the sterilized membrane composite of this invention retains a desirable degree of hydrophobicity/oleophobicity such that it is not wet by aqueous solutions including solutions containing surfactants. The composites are useful as gas vents to selectively pass gas through while preventing passage of organic and aqueous liquids through such as in the apparatus described in U.S. Pat. No. 3,854,907 which is incorporated herein by reference. Thus, the composites of this invention can be utilized as a seal for organic and aqueous liquids. In addition, the composites of this invention can be utilized as a filter for gases.

The following example illustrates the present invention and is not intended to limit the same.

EXAMPLE 1

A 0.2 micron microporous polyethersulfone membrane and polyvinylidene fluoride membranes having average pore sizes of 0.1 and 0.2 microns were dip-coated into a reactant solution containing 4.0 g 1H, 1H-pentadecafluorooctyl acrylate, 0.20 g ethoxylated trimethylolpropane triacrylate, 0.25 g 4-(2-hydroxyethoxy) phenyl-(2-hydroxy-2-propyl) ketone (Irgacure 2959), and 2.0 g acetone dissolved in 93.55 g of 2-methyl-2,4-pentanediol. The wet membranes were sandwiched between two pieces of polyethylene, sealed and irradiated with high intensity ultraviolet (UV) radiation by transporting the membranes through a UV chamber at a rate of approximately 3.0 meters/min. After UV exposure for approximately 4 seconds the membranes were rinsed with water and air-dried to constant weight (weight add-on was approximately 5%). The membranes were then oven dried for 1 hr at 135° C. The membranes typically retain approximately 70–95% of their original air permeability after modification, and are not spontaneously wet by alcohols or hexane.

We claim:

1. The process for forming a composite porous polymeric membrane formed from a porous polymeric membrane substrate having an average pore size between about 0.001 and 10 microns formed of a first polymer, said substrate having a surface which is modified on its entire surface with a cross-linked second polymer such that is does not wet with a solvent having a surface tension greater than about 21 mN/m, said composite porous polymeric membrane having essentially the same porous configuration as said porous polymeric membrane substrate which comprises; contacting said porous polymeric membrane substrate with a solution of a polymerizable fluorine containing monomer and a cross-linking agent for said monomer in a polar solvent system having a dielectric constant above 25 at room temperature under conditions to polymerize said monomer and to crosslink said second polymer in situ over the entire surface of said first polymer and to avoid plugging of pores of said polymeric membrane substrate.

2. The process of claim 1 wherein said first polymer is a polyamide.

3. The process of claim 1 wherein said first polymer is a cellulosic.

4. The process of claim 1 wherein said first polymer is a fluorinated hydrocarbon polymer.

5. The process of claim 4 wherein said first polymer is polyvinylidene fluoride.

6. The process of claim 1 wherein said first polymer is a polyolefinic hydrocarbon.

7. The process of claim 1 wherein said first polymer is a polysulfone.

8. The process of claim 7 wherein said first polymer is polyethersulfone.

9. The process of claim 1 wherein said first polymer is a polyester.

10. The process of claim 1 wherein said first polymer is a polycarbonate.

11. The process of claim 1 wherein said first polymer is a polyurethane.

12. The process of claim 1 wherein said first polymer is a polyvinyl chloride.

13. The process of claim 1 wherein said first polymer is an acrylic polymer.

14. The process of claim 1 wherein said solvent is water soluble.

15. The process of claim 1 wherein said solvent is a polyol.

16. The process of claim 15 wherein said solvent is 2-methyl-2,4-pentanediol.

17. The process of claim 1 wherein said monomer is a fluoroacrylate.

18. The process of claim 1 wherein said monomer is a fluoroalkylsiloxane.

19. The process of claim 1 wherein said monomer is a fluorinated styrene.

20. The process of claim 1 wherein said monomer is a fluoroolefin.

21. The process of claim 17 wherein said fluoro-acrylate is 1H, 1H-pentadecafluorooctyl acrylate.

22. The process of claim 1 wherein said solvent is 2-methyl-2,4-pentanediol and said monomer is 1H, 1H-pentadecafluorooctyl acrylate.

23. The process of claim 1 wherein said solution includes a polymerization initiator.

* * *